US011571092B1

(12) United States Patent
Tomerlin et al.

(10) Patent No.: US 11,571,092 B1
(45) Date of Patent: Feb. 7, 2023

(54) SAFETY DEVICE AND SYSTEMS FOR BATH ENCLOSURES

(71) Applicants: Reggie Tomerlin, Riverside, CA (US); Justin Leisey, San Diego, CA (US)

(72) Inventors: Reggie Tomerlin, Riverside, CA (US); Justin Leisey, San Diego, CA (US)

( * ) Notice: Subject to any disclaimer, the term of this patent is extended or adjusted under 35 U.S.C. 154(b) by 0 days.

(21) Appl. No.: 17/712,777

(22) Filed: Apr. 4, 2022

(51) Int. Cl.
*A47K 3/00* (2006.01)
*A47K 3/28* (2006.01)
*C09J 5/08* (2006.01)
*A47K 3/12* (2006.01)

(52) U.S. Cl.
CPC .............. *A47K 3/003* (2013.01); *A47K 3/281* (2013.01); *C09J 5/08* (2013.01); *A47K 3/125* (2013.01)

(58) Field of Classification Search
CPC ........ A47K 3/003; A47K 3/125; A47K 3/281; C09J 5/08
USPC ............................... 4/559, 571.1, 576.1, 611
See application file for complete search history.

(56) References Cited

U.S. PATENT DOCUMENTS

| | | | | |
|---|---|---|---|---|
| 3,504,878 A | * | 4/1970 | Dressler | A47G 25/0607 248/467 |
| 5,340,070 A | * | 8/1994 | Soma | A47K 3/125 4/611 |
| 5,690,237 A | * | 11/1997 | Marzec | A47K 3/003 211/105.1 |
| 7,124,451 B2 | | 10/2006 | Moore | |
| 7,603,728 B2 | | 10/2009 | Roth | |
| 8,393,020 B2 | | 3/2013 | Grant | |
| 8,556,224 B2 | * | 10/2013 | Kharchenko | A47K 10/10 4/576.1 |
| 9,486,111 B2 | | 11/2016 | Flannery et al. | |
| 2004/0107543 A1 | * | 6/2004 | Ruana | B25G 1/10 16/431 |
| 2008/0222790 A1 | | 9/2008 | Grant | |
| 2011/0024583 A1 | * | 2/2011 | Hoernig | A47K 17/022 29/525.01 |
| 2021/0259477 A1 | * | 8/2021 | Schlabach | A47K 3/003 |

* cited by examiner

*Primary Examiner* — Tuan N Nguyen

(57) ABSTRACT

Disclosed are systems and devices including handholds that can be added to bath enclosures to improve safety of the user. The handhold can be securely attached to a shower surface or a bath surface. A handle is configured to provide the handhold by allowing a user to grasp thereto. A support substrate is coupled to the handle providing a rigid base. A first adhesive layer couples the support substrate to the shower surface or the bath surface and is configured to support the weight of the system upon mounting the system to the shower surface or the bath surface. A second adhesive layer couples the support substrate to the shower surface or the bath surface and is configured to support the weight of the system and a weight applied by the user after curing.

19 Claims, 19 Drawing Sheets

SAFETY DEVICE AND SYSTEMS FOR BATH ENCLOSURES

TECHNICAL FIELD

The subject matter described herein relates to systems and devices that improve the safety of bath enclosures by providing a handhold to a shower surface or a bath surface.

BACKGROUND

Every year, thousands of falls occur in home bathrooms including bath enclosures such as showers and bath tubs. These falls are a primary cause of injuries that include limb fractures and result in varying degrees of injury, and too often lead to fatalities. This is of primary importance in the homes of elderly and disabled persons where such risks to life and health are increasing with advancing age. One common type of severe injury due to falling while bathing is hip fractures.

Hip fractures in older adults are a leading public health concern. The incidence of hip fractures has been declining over the past decade; however, the total number of fractures has grown exponentially. The number of hip fractures in the United States could total 840,000 by the year 2040. Older adults are currently the fastest growing segment of the U.S. population. The population aged 65 years and older is predicted to more than double by 2050, increasing from about 39 million today to about 89 million. It has been estimated that 1 in 3 women and 1 in 12 men will sustain a hip fracture in their lifetime. It has been reported that 86% of hip fractures occur in individuals aged 65 years and older.

Hip fractures are associated with significant morbidity, mortality, loss of independence, and financial burden. In usual care, the reported 1-year mortality after sustaining a hip fracture has been estimated to be 14% to 58%. The relative risk of mortality in the elderly patient population increases 4% per year. The first year after a hip fracture appears to be the most critical time. A recent meta-analysis revealed that women sustaining a hip fracture had a 5-fold increase and men almost an 8-fold increase in relative likelihood of death within the first 3 months as compared with age- and sex-matched controls. The relative hazards decreased substantially over the first 2 years after fracture but never returned to the mortality rates of the controls.

According to the website aginginplace.org/a-guide-to-bathroom-grab-bars/, "The fear of falling and getting hurt can keep you from doing a lot of things—including taking a bath. Seniors can become reluctant to bathe or shower as often as they should because they don't want to run the risk of getting hurt. Poor hygiene can create infections and skin problems. It's important for overall good health as we get older to bathe twice a week at the very least. Installing grab bars in your shower can give you the confidence and stability you need to bathe every day, reducing the chance of infections."

Safety grab handles have been used in bath enclosures to help prevent falls while bathing. Traditional safety grab handles have marginal reliabilities. Many traditional safety handles using suction cups actually raise risk levels by fostering a sense of false security. Suction cup devices must be applied to smooth, flat, non-porous surfaces, cannot cover grout lines and will not work on textured surfaces. Suction cup devices be reattached before each use, and cannot hold full body weight. Despite these usage instructions, suction cup devices frequently fail, Often the suction of traditional safety grab handles will break without notice resulting in the grab handle becoming separated from the wall.

Grab handles installed with mechanical fasteners are generally safe, but they require the skilled installer to locate wall studs behind the wall, drill often hard ceramic tile surfaces and install a multiple of threaded fasteners sufficiently well to support loads of greater than 250 pounds. Home occupants may not have the necessary tools and/or skills to properly install grab handles installed with mechanical fasteners. As tenants, they may not be permitted by the owner to install or remove these type of grab handles that can permanently alter the shower surface or the bath surface.

SUMMARY

Provided herein are, inter olio, solutions to these and other problems in the art. Aspects of the current subject matter relate inter cilia to systems providing secure handholds to shower surfaces or bath surfaces. Unlike suction cup grab handles, systems according to present disclosure provide high levels of adhesion to porous or uneven shower surfaces or bath surfaces. Unlike mechanically-fastened grab handles, systems according to present disclosure do not damage or alter shower surfaces or bath surfaces, and can be removed with no trace.

Systems according to present disclosure are easy to install for elderly and/or unskilled users. The flexibility of the system allows the user to place the grab handle in a position for optimum safety, rather than having to rely on tile spacing for placement (e.g. suction cup grab handles), or rather than having to rely on the stud spacing for placement (e.g. mechanically-fastened grab handles).

In variations, one or more of the following features may be included in any feasible combination. For example, a system providing a handhold to a shower surface or a bath surface includes a handle configured to provide the handhold by allowing a user to grasp thereto. The system also includes a support substrate coupled to the handle providing a rigid base, with the support substrate having an outward surface facing the handle and an inward surface facing the shower surface or the bath surface. The system further includes a first adhesive layer for coupling the support substrate to the shower surface or the bath surface, with the first adhesive layer configured to support the weight of the system upon mounting the system to the shower surface or the bath surface. The system further includes a second adhesive layer for coupling the support substrate to the shower surface or the bath surface, with the second adhesive layer configured to support the weight of the system and a weight applied by the user after curing.

In some embodiments, the handle can be coupled to the support substrate in two locations. The handle can have two ends and can be coupled to the support substrate at each end of the handle. The handle can also be coupled to the support substrate at more than two locations. The handle can be coupled to the support substrate with a treaded fastener and/or with a third adhesive.

In some embodiments, the handle is removably coupled to the support substrate and is removable after the system is attached to the shower surface or the bath surface. The handle can couple to the support substrate with a slot and protrusion.

In some embodiments, the handle and the support substrate are each portions of a monolithic structure.

In some embodiments, the support substrate is a rigid planar material. The support substrate can a metal, a composite, a polymer material, and any combination thereof. The outward surface and the inward surface of the support substrate can be substantially parallel. The outward surface can be substantially smooth. The inward surface can include a plurality of grooves, channels, and/or voids. The plurality of grooves, channels, and/or voids can comprise between 10% to 50% of a surface area of the inner surface, 15% to 45% of a surface area of the inner surface, 20% to 40% of a surface area of the inner surface, or 25% to 35% of a surface area of the inner surface. The inward surface can include a texture configured to increase adhesion with the first adhesive layer and/or the second adhesive layer. The inward surface can include a surface roughness configured to increase adhesion with the first adhesive layer and/or the second adhesive layer.

In some embodiments, the first adhesive layer is a self-adhesive layer. The first adhesive layer can be a self-adhesive tape. The first adhesive layer can be a self-adhesive foam tape. The first adhesive layer can be a self-adhesive, closed-cell foam tape.

In some embodiments, the second adhesive layer can be a silicone adhesive. The second adhesive layer can include a second adhesive that cures at room temperature when exposed to moisture. The second adhesive layer can be formed by dispensing a second adhesive on the inward surface and then pressing the support substrate toward the shower surface or the bath surface until the first adhesive layer contacts both the inward surface and the shower surface or the bath surface. The first adhesive layer has a first layer thickness and the second adhesive layer has a second layer thickness. The first layer thickness can be selected to form the second layer thickness. The first layer thickness can be substantially equal to the second layer thickness and the first adhesive layer and the second adhesive layer are substantially coplanar. The plurality of channels can be configured to form the second layer thickness by allowing excess second adhesive to flow therethrough and form a mechanical connection between support substrate and cured second adhesive.

In some embodiments, a surface modification component can be disposed around at least a portion of the handle. The surface modification component that can increase friction between the user and the handle under wet conditions. The surface modification component can include a textured surface.

In some embodiments, the system supports an applied force of greater than about 250 pounds of force before failure. In some embodiments, the system supports an applied force of greater than about 450 pounds of force before failure.

In some embodiments, a system providing a handhold to a shower surface or a bath surface includes a handle configured to provide the handhold by allowing a user to grasp thereto. The system also includes a support substrate coupled to the handle providing a rigid base, with the support substrate having an outward surface facing the handle and an inward surface facing the shower surface or the bath surface. The system further includes a first adhesive layer comprising a self-adhesive, closed-cell foam tape for coupling the support substrate to the shower surface or the bath surface, with the first adhesive layer configured to support the weight of the system upon mounting the system to the shower surface or the bath surface. The systems further includes a second adhesive layer comprising a moisture-cure silicone adhesive for coupling the support substrate to the shower surface or the bath surface, with the second adhesive layer configured to support the weight of the system and a weight applied by the user after curing and formed by dispensing a second adhesive on the inward surface and then pressing the support substrate toward the shower surface or the bath surface until the first adhesive layer contacts both the inward surface and the shower surface or the bath surface, with the first layer thickness is substantially equal to the second layer thickness and the first adhesive layer and the second adhesive layer are substantially coplanar.

In some embodiments, a kit is provided. The kit includes a handle configured to provide the handhold by allowing a user to grasp thereto. The kit also includes a support substrate coupled to the handle providing a rigid base. The kit further includes a first adhesive comprising a closed-cell foam tape, with the first adhesive configured to support the weight of the system upon mounting the system to the shower surface or the bath surface. The kit further includes a second adhesive comprising a moisture-cure silicone adhesive for coupling the support substrate to the shower surface or the bath surface, with the second adhesive layer configured to support the weight of the system and a weight applied by the user after curing and formed by dispensing the second adhesive on the inward surface and then pressing the support substrate toward the shower surface or the bath surface until the first adhesive layer contacts both the inward surface and the shower surface or the bath surface, with the first layer thickness is substantially equal to the second layer thickness and the first adhesive layer and the second adhesive layer are substantially coplanar.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

DETAILED DESCRIPTION

Figure 1:
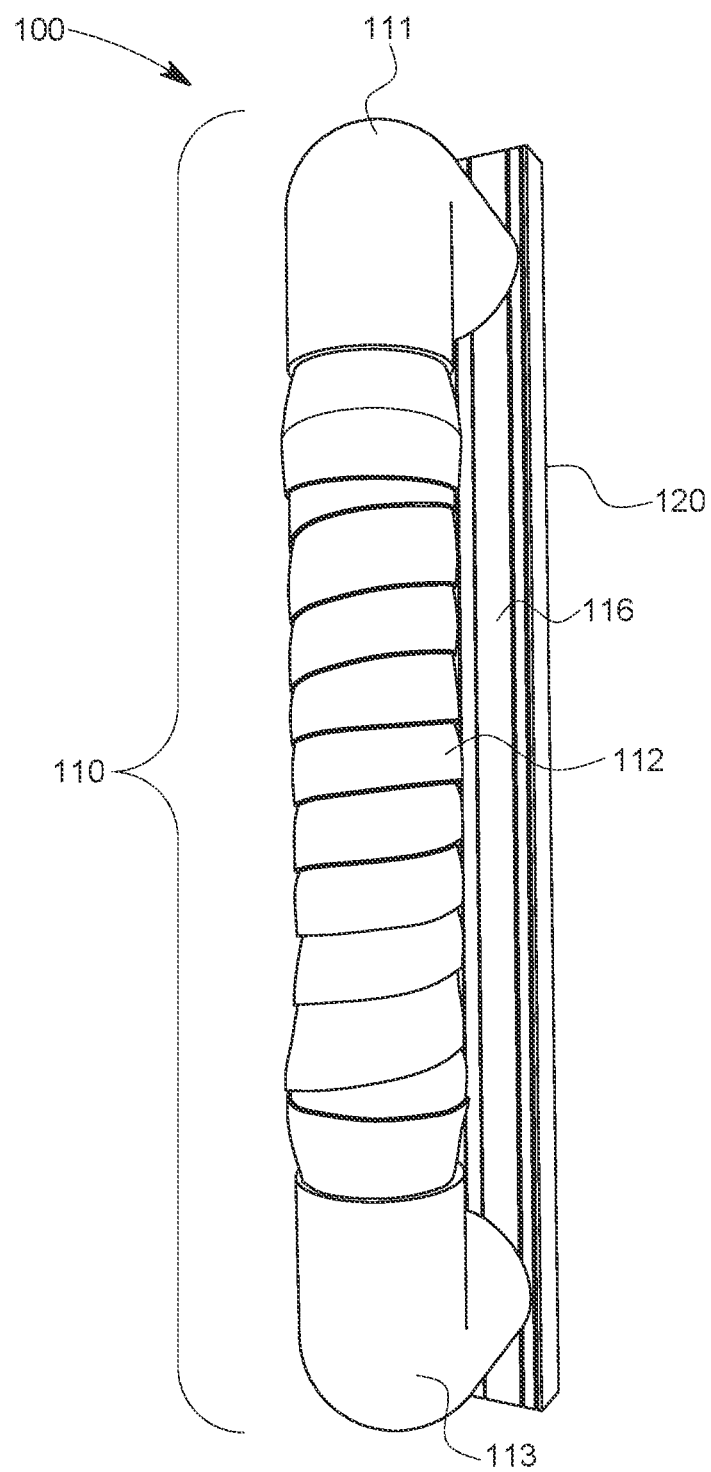
FIG. 1 is a top view of an exemplary handle coupled to a support substrate consistent with implementations of the current disclosure.

This disclosure presents designs of bath safety grab handles that are evermore improved over current states of art offering great simplicity and ease of installations, tool-less installations, and structural permanency and redundancy. Moreover, handles of this design greatly stabilize and strengthen the surfaces to which they are attached. In other words, the rigidity and strength of the support substrate actually strengthens the shower or bath surfaces to which it is attached.

In embodiments, the design uses water-resistant RTV (room temperature vulcanizing) silicone adhesive formed into a layer that permanently bonds the system to bath and other surfaces made of ceramic tiles (of any size), mosaics, granite, quartz, glass, metal, or many polymeric surfaces. The large bond areas can cross tile grout lines, voids, and other imperfections in the shower surface or the bath surface. Location and orientations of the system are at the choice of the user and can be optimized for safety while bathing, or while enter and exiting the bath enclosure, something that not available to alternative designs. The systems may be attached to many textured surfaces, which may actually enhance the adhesion of the system. In embodiments, the base of these handles are aluminum extrusions that offer evermore strength and stillness and increased bond area. The aluminum extrusions may be anodized to provide corrosion resistance, as well as color matched to existing bath décor. The systems can be produced in various lengths as desired. Simple or complex design arrangements can be produced and also easily installed.

Pressure sensitive adhesives exhibit the necessary initial green strength for holding the system in place while a second adhesive cures to provide a high strength bond, Pressure sensitive adhesives are available with double-sided adhesive surrounding a foam or elastomeric polymer tape. The thickness of the pressure sensitive adhesive spaces the support substrate from the shower surface or the bath surface, and determines the bondline adhesive thickness for the second adhesive. Examples of pressure sensitive adhesives for use with the system are disclosed herein and include 3M VHB tape, 3M 4026 foam tape, and Dow Dowsil 7667.

Silicone elastomeric adhesives exhibit the necessary water resistance to perform their essential function over a long period of years. Examples of suitable silicone adhesives for use with the system are disclosed herein and include Dow 732, MG Chemicals RTV102, and 3M Super Silicone. For example, Dow 732 can be used with bond lines of up to 3 mm and cures by a reaction with moisture in the air and can cure in about 24 hours. Channels and/or voids in the support substrate allow air circulation and reduce curing time by allowing atmospheric moisture to react with the adhesive.

When the kit including the handle attached to the support substrate is removed from its shipping packaging, the user has only to clean the selected bath wall surfaces with the optionally provided cleaner that is sealed in a foil packet, apply the silicone adhesive (i.e. second adhesive) from the supplied tube of adhesive to the inward surface of the support substrate, remove strips of protective film from the preapplied strips of pressure sensitive film adhesive (i.e. first adhesive) used to provide temporary attachment and located at ends of the support substrate, and position the system handle assembly and press it to the cleaned bath surface. Allowing the silicone adhesive to cure by reacting with normal humidity in the air will form a lasting adhesive bond and provide excellent safety and security after 24 hours. To this end, no drilling or mechanical fasteners will be required to enable users of any age or others with physical limitations to perform the installations. Multiple handles may be installed in different locations and/or orientations to render bath showers or other bathroom locations sufficiently safe.

Described herein are systems and devices that improve the safety of bath enclosures by providing a handhold to a shower surface or a bath surface. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed disclosure.

Reference throughout this specification to "one embodiment" or "an embodiment" means a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or"

is generally employed in its sense including "and/or" unless the content clearly dictates otherwise.

The word "about" when immediately preceding a numerical value means a range of plus or minus 10 of that value, e.g., "about 50" means 45 to 55. "about 25,000" means 22,500 to 27,500, etc. Furthermore, the phrases "less than about" a value or "greater than about" a value should be understood in view of the definition of the term "about" provided herein.

FIG. 1 is a top view of a system 100 comprising an exemplary handle 110 coupled to a support substrate 120 having an outward surface 116 facing the handle 110. The handle 110 includes a first end 111 and a second end 113 that are each attached to the support substrate 120. A central grip portion 112 provides an area where a user can grasp the handle 110 thus providing a secure handhold for the user. The support substrate 120 provides a rigid base that resists flexing as load are applied to various portions of the handle 110. While the handle 110 in FIG. 1 is shown as being coupled to the support substrate 120 in two locations, with each location being at the end of handle 110, it should be appreciated that coupling in only one location is required at a minimum, and that coupling in more than two locations is also possible.

Figure 2A:
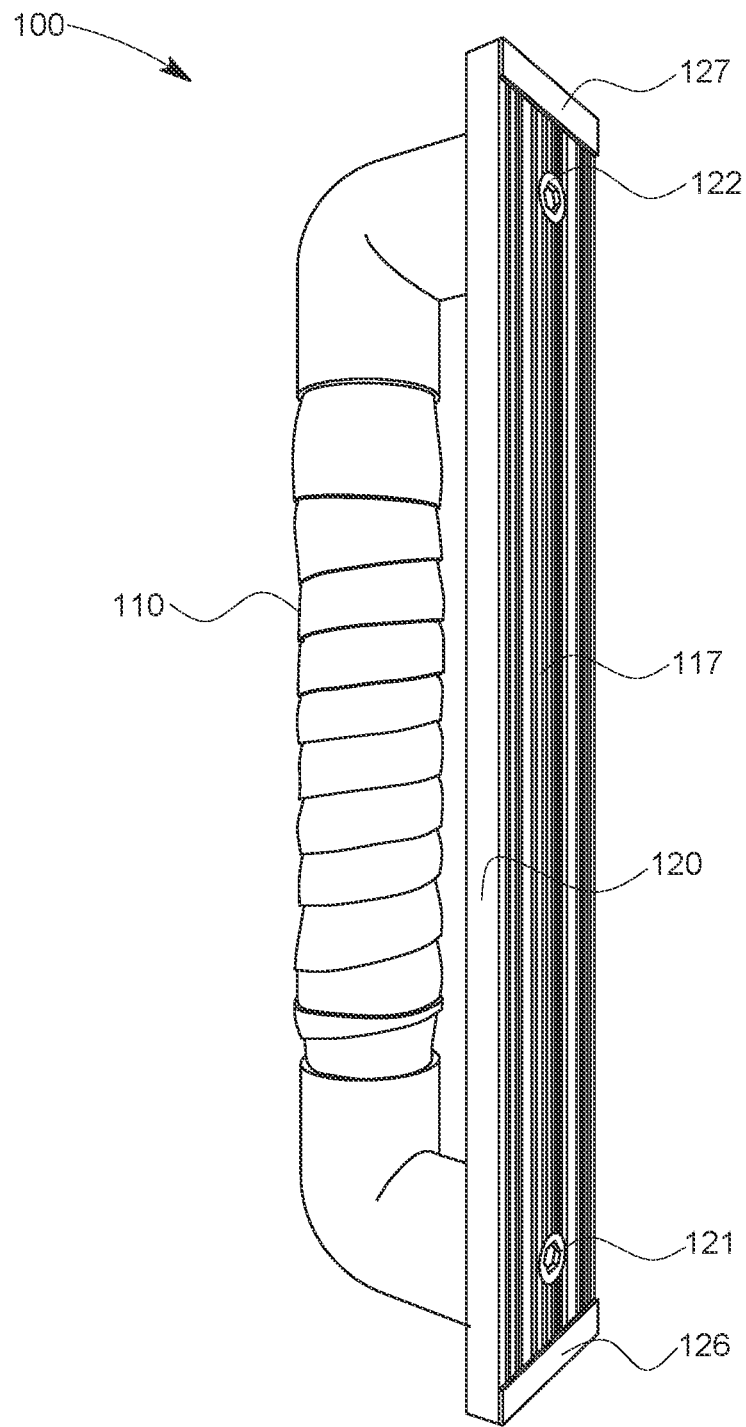
FIG. 2A is a side view of an exemplary handle coupled to a support substrate consistent with implementations of the current disclosure.

FIG. 2A is a side view of a system 100 comprising an exemplary handle 110 coupled to a support substrate 120 with a first fastener 121 and a second fastener 122. Disposed at each end of the support substrate 120 is a first adhesive layer portion 126 and another first adhesive layer portion 127. The first adhesive layer portions 126 and 127 couple the support substrate 120 to the shower surface or the bath surface and are configured to support the weight of the system upon mounting the system to the shower surface or the bath surface. While the first adhesive layer portions 126 and 127 are disposed on the inward surface 117 at the farthest edges of support substrate 120, it should be appreciated that the first adhesive layer portions 126 and 127 can be also applied to the sides or middle portions of the inward surface 117. In this manner, additional portions of the first adhesive can be applied to the inward surface 117 to provide additional green strength before the second adhesive cures. The first adhesive layer can be a self-adhesive layer, in particular a double sided pressure sensitive adhesive. The first adhesive layer can be in the form of a self-adhesive tape. The first adhesive layer can be a self-adhesive foam tape, in particular a self-adhesive, closed-cell foam tape.

Figure 2B:
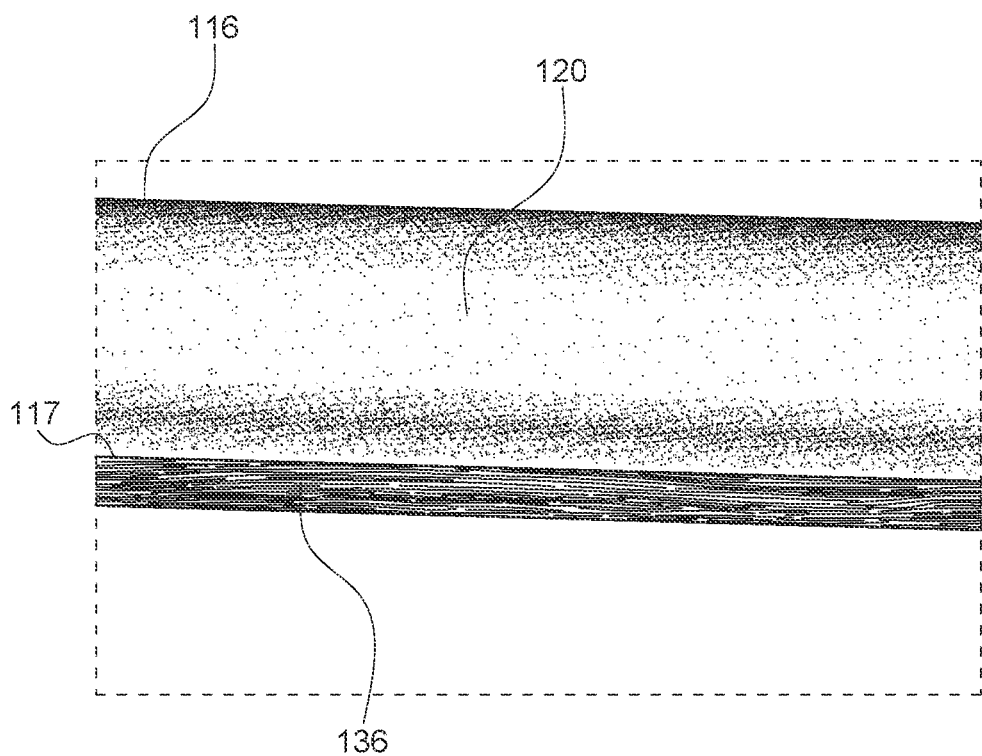
FIG. 2B is a front view of an a support substrate coated with a second adhesive consistent with implementations of the current disclosure.

FIG. 2B is a front view of an a support substrate 120 having an outward surface 116 and an inward surface 117 that coated with a second adhesive 136. The second adhesive layer is configured to support the weight of the system and a weight applied by the user after curing. The second adhesive layer is formed by dispensing a second adhesive 136 on the inward surface 117 and then pressing the support substrate 120 toward the shower surface or the bath surface 130 until the first adhesive layer contacts both the inward surface 117 and the shower surface or the bath surface 130. In this manner, the first layer thickness is selected to form the second layer thickness. The first layer thickness is substantially equal to the second layer thickness and the first adhesive layer and the second adhesive layer are substantially coplanar.

Figure 3:
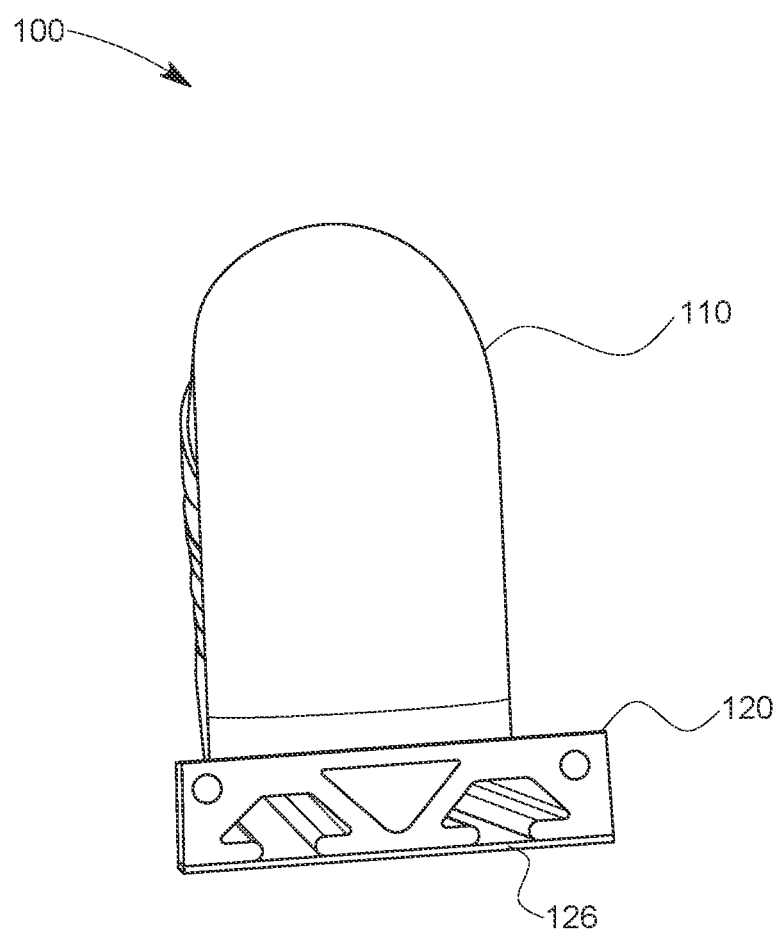
FIG. 3 is a end view of an exemplary handle coupled to a support substrate consistent with implementations of the current disclosure.

FIG. 3 is a end view of a system 100 comprising an first end 111 of a handle coupled to a support substrate consistent 120 with implementations of the current disclosure. A first adhesive layer portion 126 having a first layer thickness is disposed at an end of the support substrate 120. The thickness of the first adhesive layer can be selected to provide the bondline thickness of the second adhesive layer (not shown). In this manner, thinner bondlines can be used for smooth shower and bath surfaces, while thicker bondlines can be used for textured and uneven shower and bath surfaces.

Figure 4:
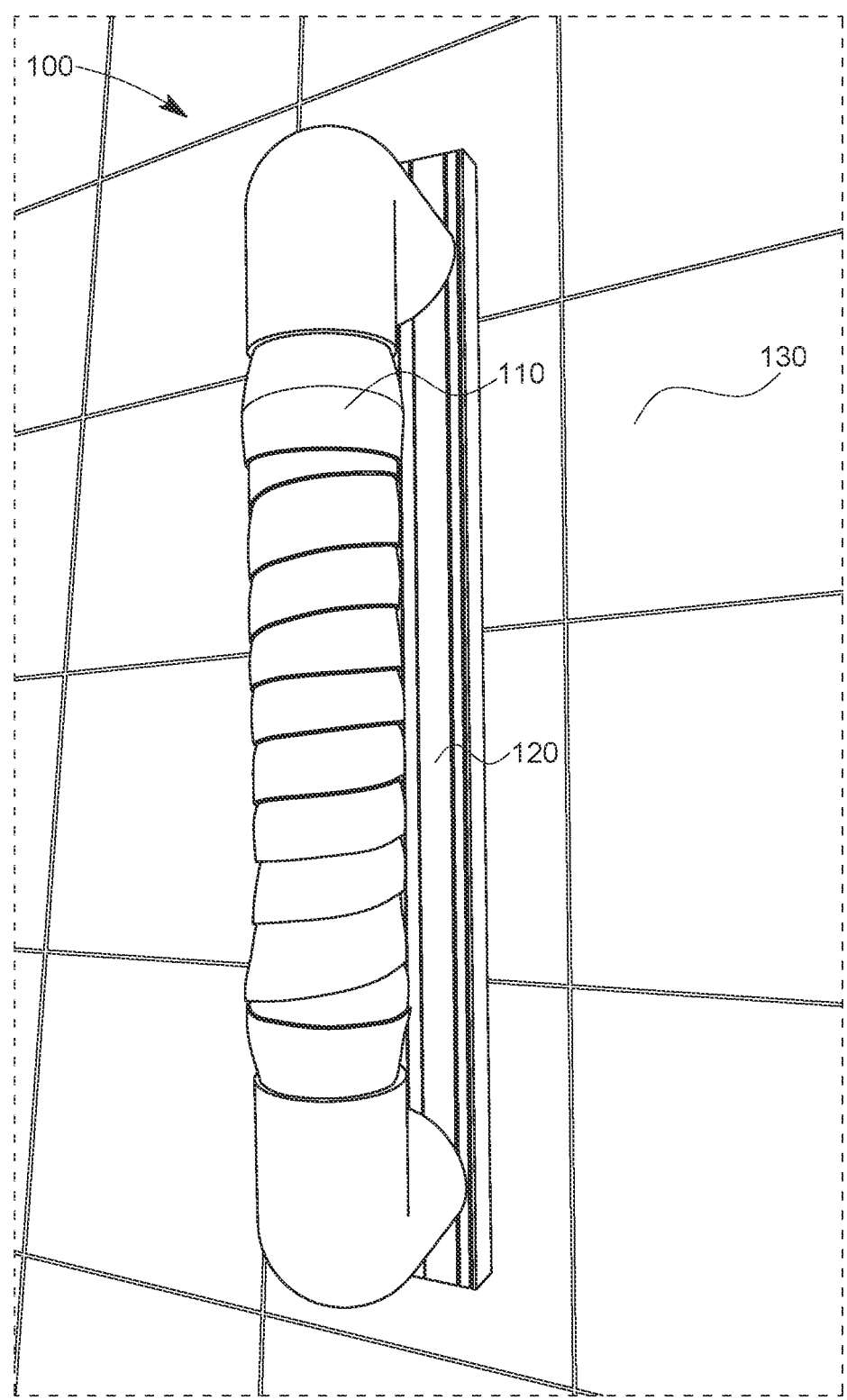
FIG. 4 is an exemplary handle coupled to a support substrate and attached in a vertical orientation to a tiled shower surface consistent with implementations of the current disclosure.

FIG. 4 is view of a system 100 comprising an exemplary handle 110 coupled to a support substrate 120 and attached in a vertical orientation to a tiled shower surface 130. System 100 can be applied to almost and bath or shower surface. As shown in FIG. 4, the support substrate 120 bridges three grout lines between four ceramic tiles.

Figure 5:
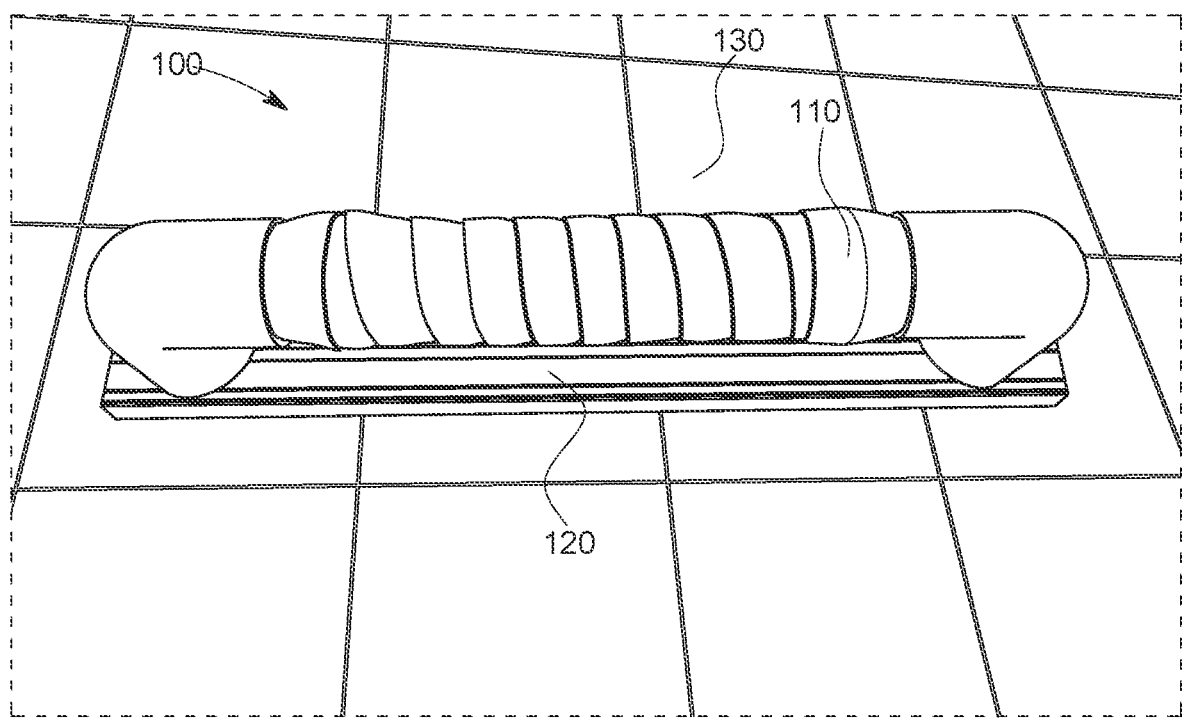
FIG. 5 is an exemplary handle coupled to a support substrate and attached in a horizontal orientation to a tiled shower surface consistent with implementations of the current disclosure.

FIG. 5 is view of a system 100 comprising an exemplary handle 110 coupled to a support substrate 120 and attached in a horizontal orientation to a tiled shower surface 130 consistent with implementations of the current disclosure. The system 100 can be mounted in any orientation, and is not limited to any particular orientation.

Figure 6:
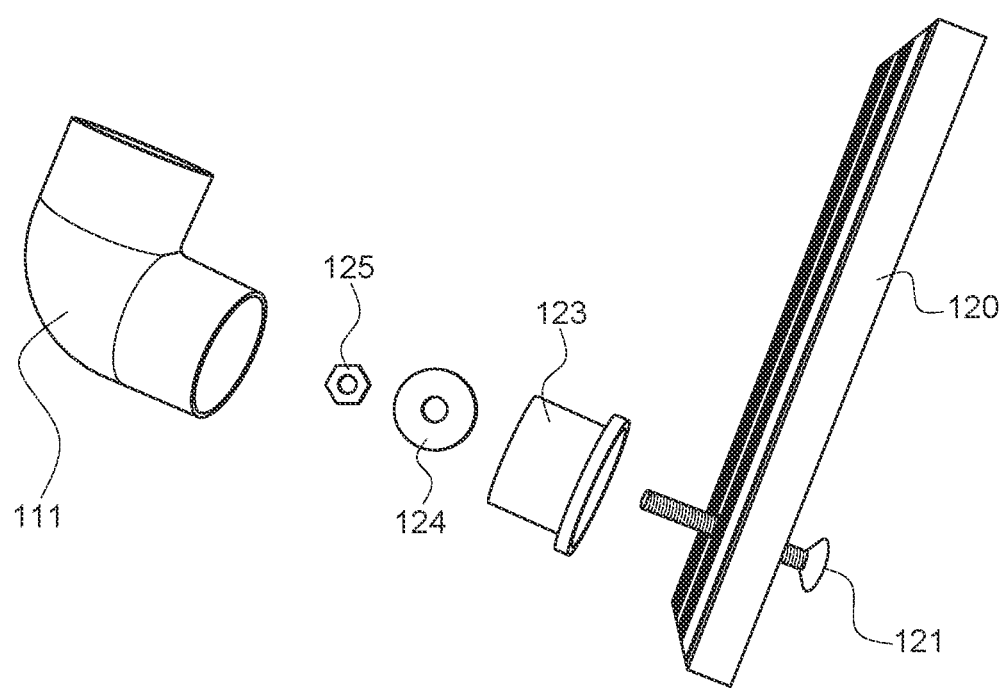
FIG. 6 is an exploded view of an exemplary assembly for coupling a handle to a support substrate consistent with implementations of the current disclosure.

FIG. 6 is an exploded view of an exemplary assembly for coupling a handle to a support substrate 120. The coupling assembly includes a threaded fastener 121 passing through support substrate 120 and tailpiece 123 that is secured to support substrate 120 by washer 124 and nut 125. The first end ill of a handle is affixed to tailpiece 123 with, for example, a third adhesive. In embodiments, the head of threaded fastener 121 is countersunk into support substrate 120. In some embodiments, the handle is permanently bonded to the support substrate with a third adhesive.

In other embodiments, the handle is removably coupled to the support substrate and is removable after the system is attached to the shower surface or the bath surface. For example, the handle can couple to the support substrate via a slot that accommodates a protrusion from the handle. These embodiments may be desirable in situations where there is limited clearance or space, for example, when a third party is assisting a user into position within the bath enclosure or helping them out. After the user is in place, the handle can be attached to the support substrate providing the user a secure handhold during bathing.

Figure 7:
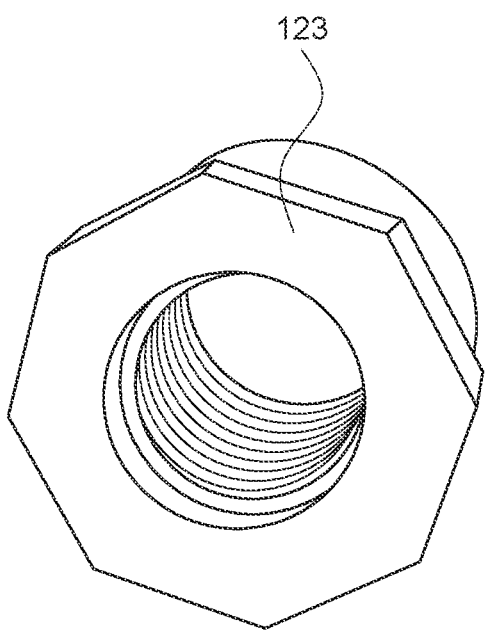
FIG. 7 is part detail view of an exemplary assembly member for coupling a handle to a support substrate consistent with implementations of the current disclosure.

FIG. 7 is part detail view of an exemplary assembly member for coupling a handle to a support substrate consistent with implementations of the current disclosure. In this implementation, tailpiece 123 is internally threaded and can couple with a fastener and attach to the substrate. Threaded fasteners and threaded assembly members can be used in configurations where it is desirable to disassemble and replace worn out or damaged handles.

Figure 8:
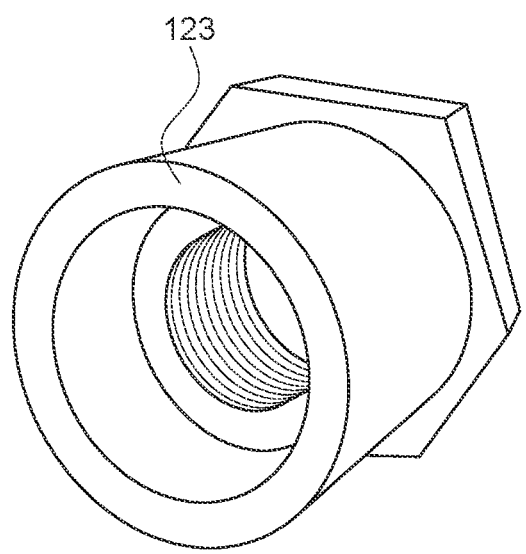
FIG. 8 is part detail view of an exemplary assembly member for coupling a handle to a support substrate consistent with implementations of the current disclosure.

FIG. 8 is part detail view of an exemplary assembly member for coupling a handle to a support substrate consistent with implementations of the current disclosure. In this implementation, tailpiece 123 is internally threaded and can couple with a fastener and attach to the substrate. While FIGS. 6-8 show exemplary assembly members and fasteners, it should be appreciated that mass produced handles may not include all parts or components that are shown in the exemplary designs. In some embodiments, the handle and the support substrate are a monolithic structure made from one piece of material, such as plastic or metal.

Figure 9:
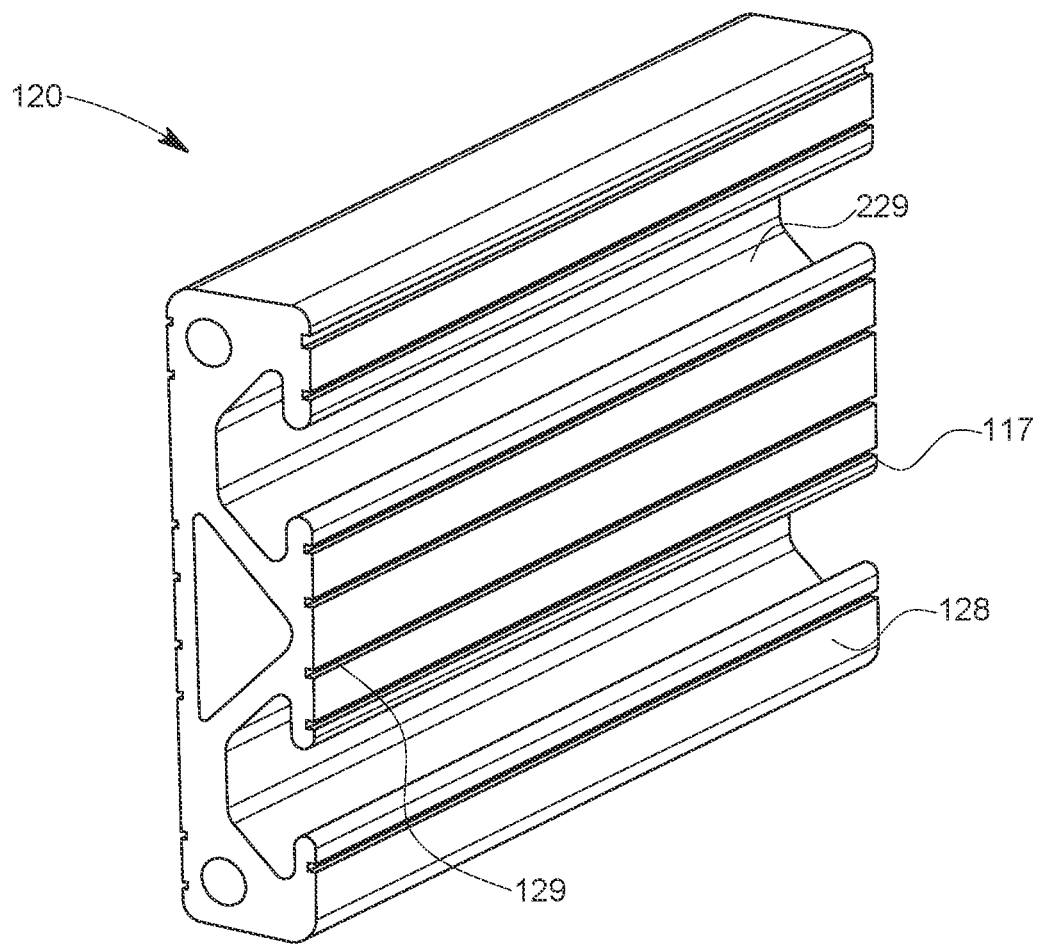
FIG. 9 is part detail view of an exemplary support substrate consistent with implementations of the current disclosure.

FIG. 9 is part detail view of an exemplary support substrate 120 consistent with implementations of the current disclosure. In embodiments, the support substrate 120 is a rigid planar material. The support substrate 120 can be made of a metal, such as aluminum, or a composite or a polymer material. The support substrate 120 includes an inward surface 117 that faces a shower surface or a bath surface. The inward surface 117 of support substrate 120 can also includes a texture 128 (i.e. surface roughness) that is configured to increase adhesion to the adhesive layers. A plurality of voids, grooves 129, and/or channels 229 can be disposed in or on the inward surface 117 support substrate 120. The voids, grooves 129, and/or channels 229 can allow atmospheric air containing moisture to circulate toward the interior areas of the inward surface 117 and promote curing of the second adhesive. The voids, grooves 129, and/or channels 229 can also allow excess adhesive to flow therethrough and facilitate spreading of the second adhesive along the inward surface 117 and bath or shower surface. The voids, grooves 129, and/or channels 229 can comprise between 10% to 50% of a surface area of the inner surface 117. The voids, grooves 129, and/or channels 229 can comprise between 15% to 45% of a surface area of the inner surface 117. The voids, grooves 129, and/or channels 229 can comprise between 20% to 40% of a surface area of the inner surface 117. The voids, grooves 129, and/or channels 229 can comprise between 25% to 35% of a surface area of the inner surface 117.

Figure 10:
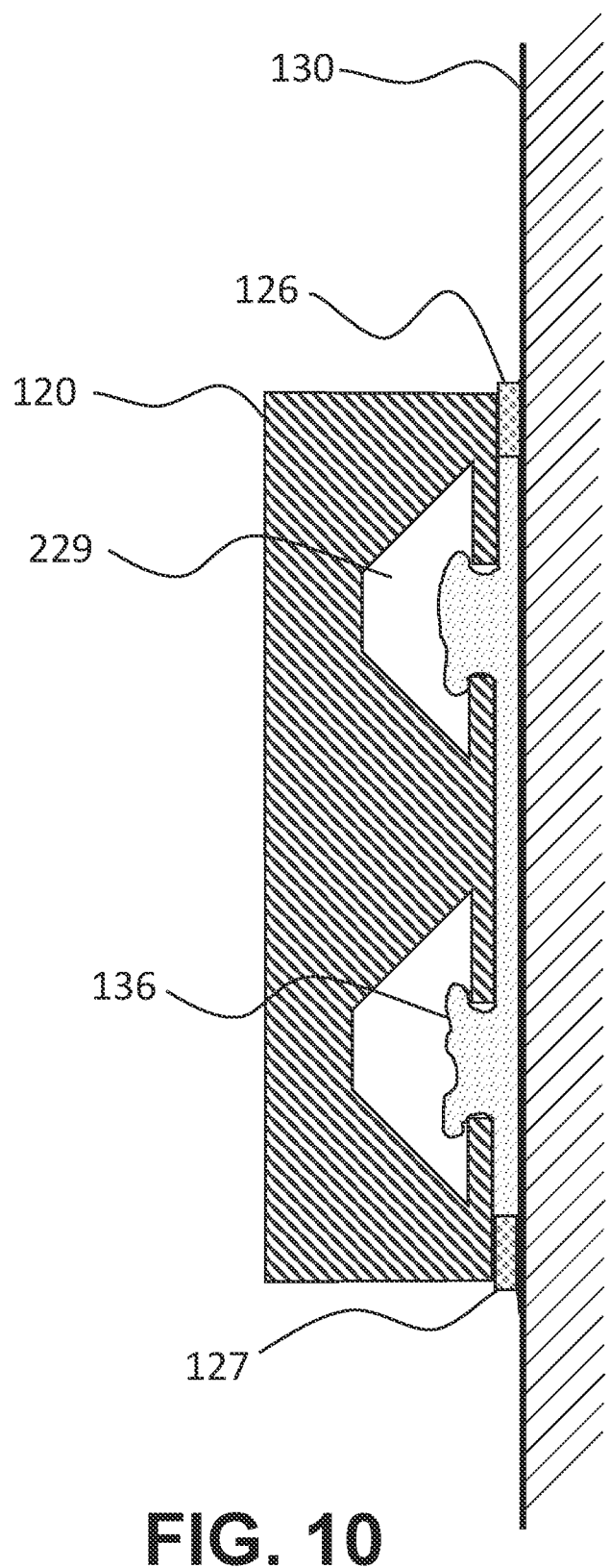
FIG. 10 is a cross sectional view of an exemplary support substrate adhered to a shower surface or a bath surface consistent attached to a with implementations of the current disclosure.

FIG. 10 is a cross sectional view of an exemplary support substrate 120 adhered to a shower surface or a bath surface 130 consistent attached to a with implementations of the current disclosure. The second adhesive 136 has a consistent bondline thickness between the support substrate 120 and shower surface or bath surface 130 due to the spacing created by first adhesive portions 126 and 126 positioned at the side edges of the support substrate 120. The excess second adhesive 136 flows into channel 229 and partially curves around the edges of channel 229. In this manner, when second adhesive 136 cures, it forms a mechanical connection to the support substrate 120, in addition to the adhesive bond between the inward surface 117 and shower or bath surface 130.

Figure 11:
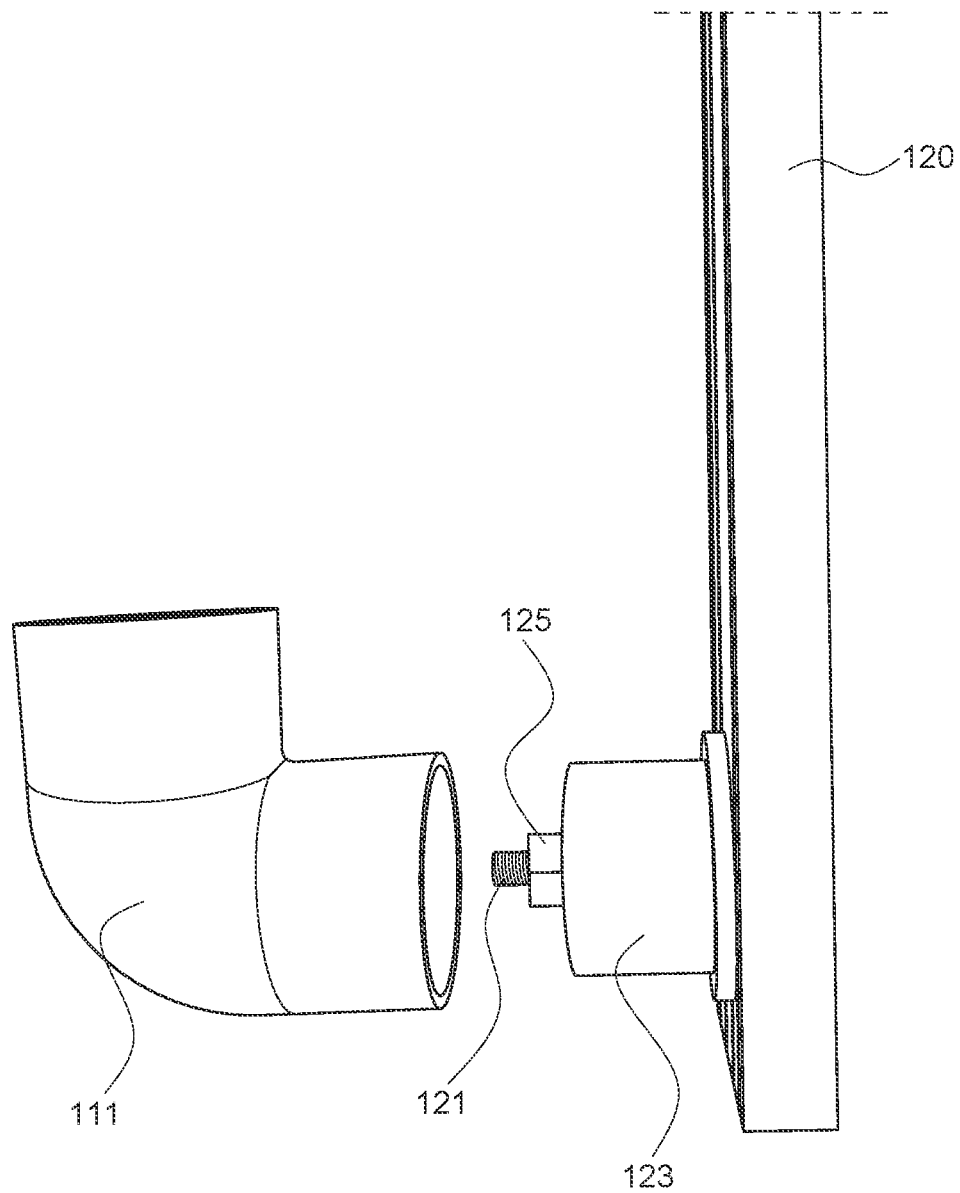
FIG. 11 is an partially exploded view of an exemplary assembly for coupling a handle to a support substrate consistent with implementations of the current disclosure.

FIG. 11 is an partially exploded view of an exemplary assembly for coupling a handle to a support substrate 120 consistent with implementations of the current disclosure. The coupling assembly includes a threaded fastener 121 passing through tailpiece 123 that is secured to support substrate 120 by washer (not shown) and nut 125. The first end 111 of a handle is affixed to tailpiece 123 with, for example, a third adhesive.

Figure 12:
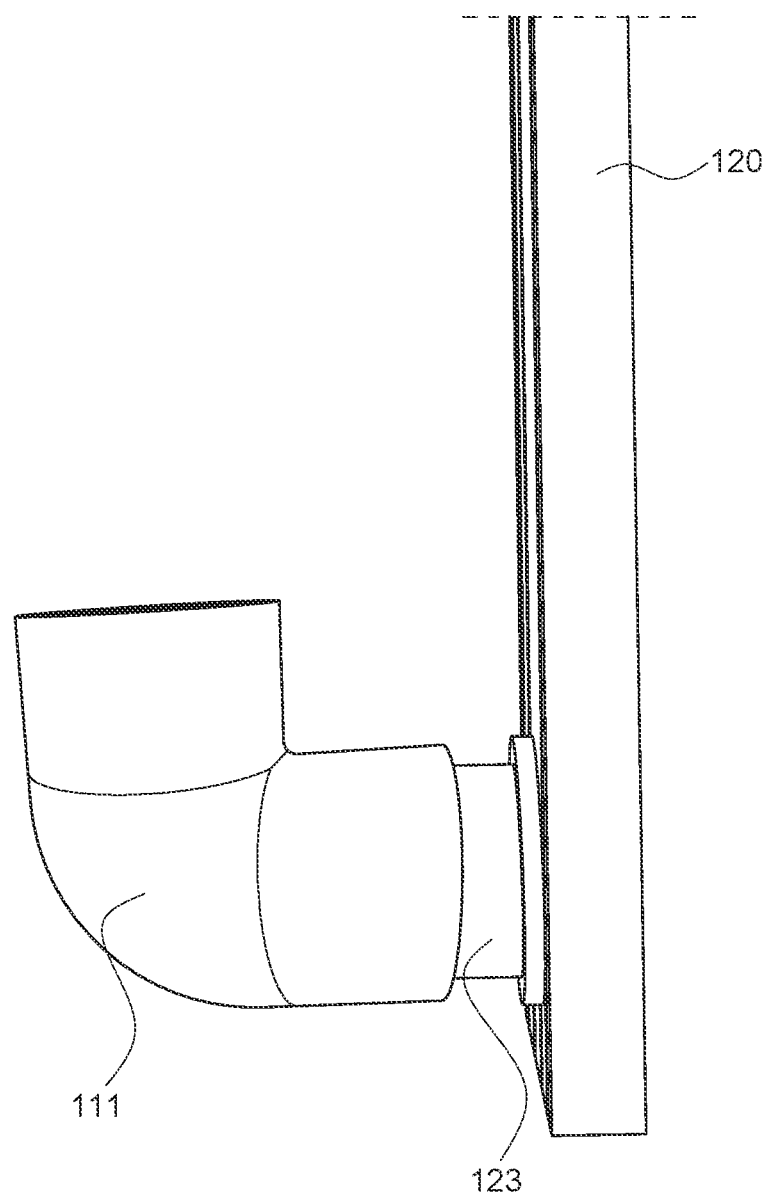
FIG. 12 is an partially assembled view of an exemplary assembly for coupling a handle to a support substrate consistent with implementations of the current disclosure.

FIG. 12 is an partially assembled view of an exemplary assembly for coupling a handle to a support substrate 120 consistent with implementations of the current disclosure. The first end 111 of a handle is being fitted over tailpiece 123 and would be fully seated on the tailpiece 123. The first end 111 of a handle can be permanently or semi-permanently affixed to tailpiece 123 with, for example, a third adhesive.

Figure 13:
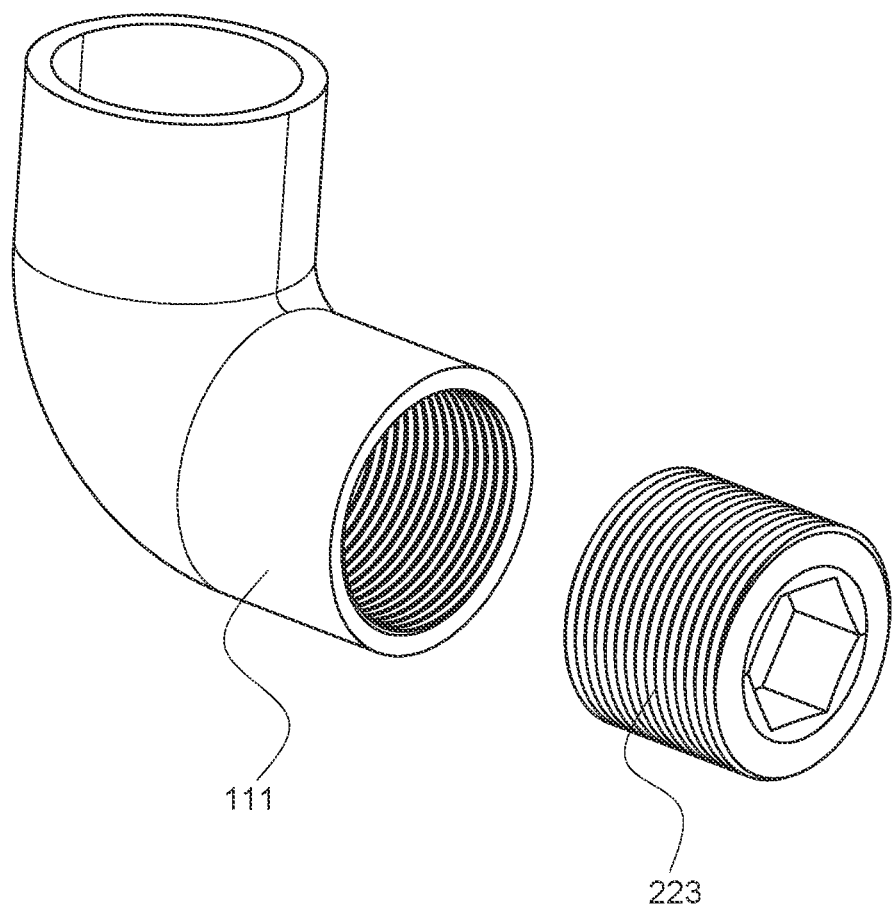
FIG. 13 is an exploded view of a portion of an exemplary assembly for coupling a handle to a support substrate consistent with implementations of the current disclosure.

FIG. 13 is an exploded view of a portion of an exemplary assembly for coupling a handle to a support substrate consistent with implementations of the current disclosure. The first end 111 of a handle can be threaded to accept a threaded insert 223. Threaded fasteners and threaded assembly members can be used in configurations where it is desirable to disassemble and replace worn out or damaged handles.

Figure 14:
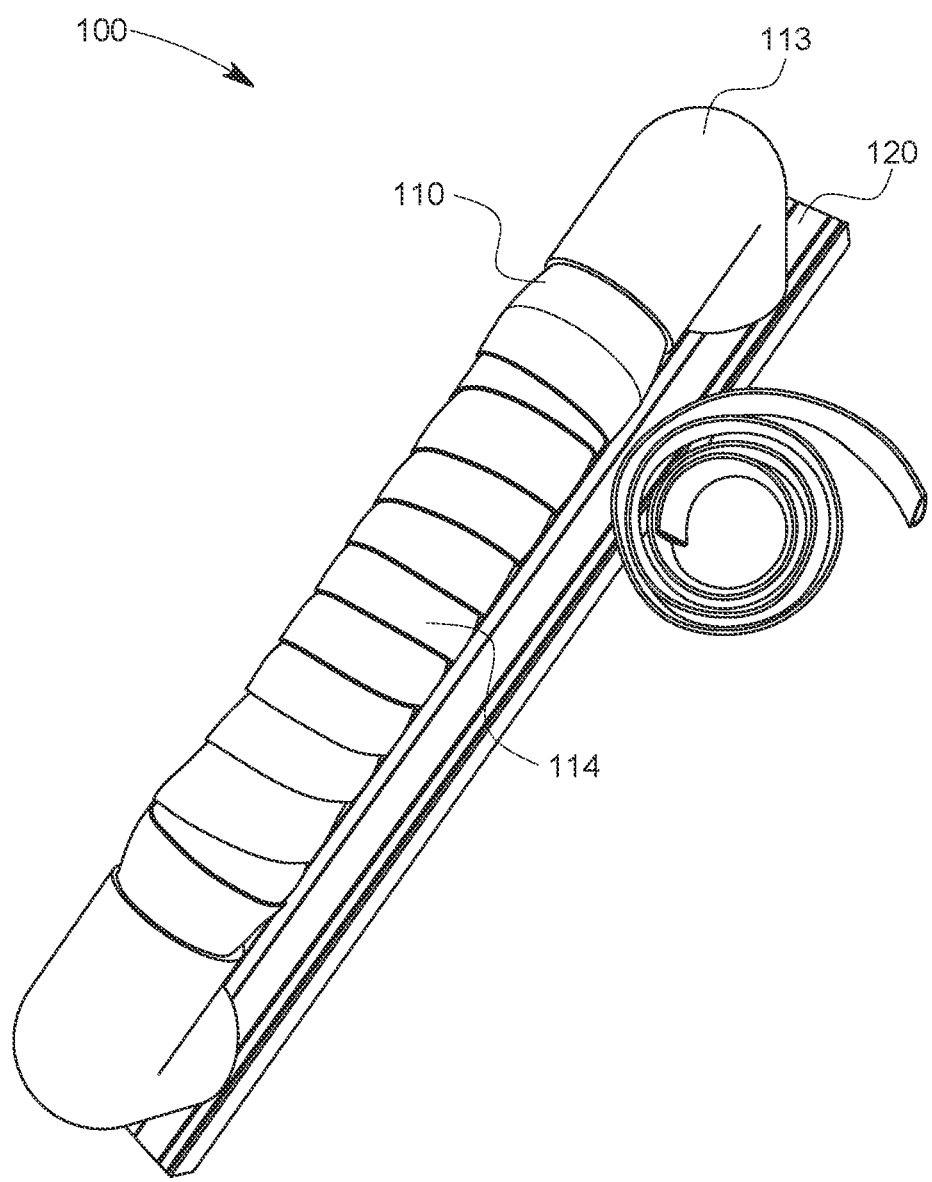
FIG. 14 is a top view of an exemplary handle including a surface modification component consistent with implementations of the current disclosure.

FIG. 14 is a top view of a system 100 comprising an exemplary handle 110 including a surface modification component 114. The handle 110 includes a second end 113 coupled to the support substrate 120. A central grip portion includes the surface modification component 114 that improves a user's grip on the handle 110, especially in wet conditions. The surface modification component 114 can include a textured surface, or form a textured surface when affixed to handle 114. The surface modification component 114 can be applied to a portion of handle 110 or can be integrated into handle 110.

Figure 15A:
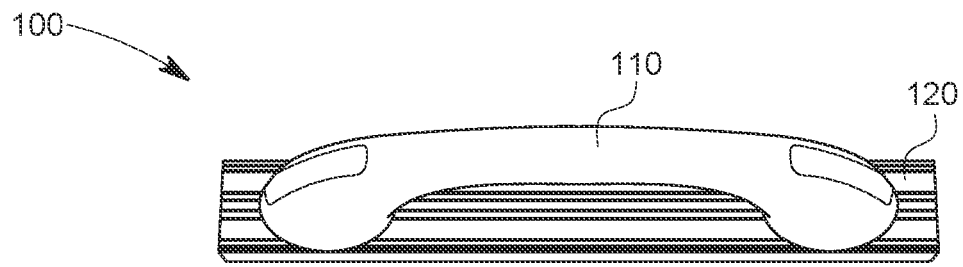
FIGS. 15A-C are views of an exemplary handles and support substrates consistent with implementations of the current disclosure.
Figure 15B:
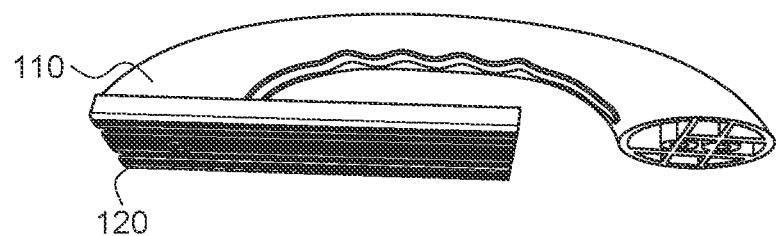
Figure 15C:
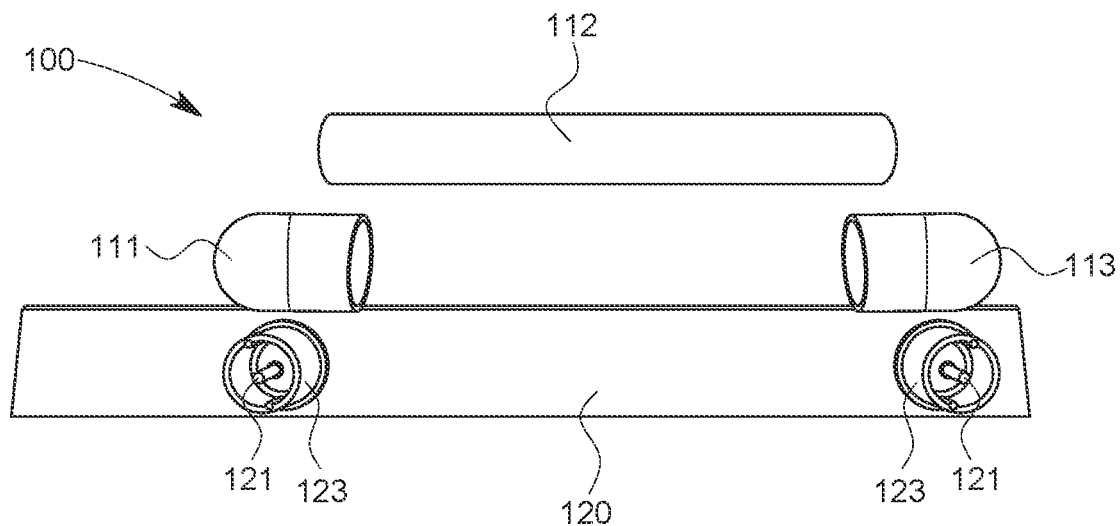

FIGS. 15A-C are views of an exemplary handles 110 and support substrates 120 consistent with implementations of the current disclosure. In FIG. 15A, a system 100 comprising an exemplary handle 110 attached to a support substrate 120 is shown. In this embodiment, the handle 110 is substantially a monolithic design with the first end and the second end being one piece along with the handle. In FIG. 15B, a cutaway view of another exemplary handle 110 attached to a half of a support substrate 120. In FIG. 15C, a system 100 comprising parts to assemble a handle including a first end 111, a central grip portion 112, and a second end 113. Fasteners 121 attach tailpieces 123 to support substrate 120 consistent with implementations of the current disclosure. It should be noted that embodiments presented are for illustrations purposes, and should not be construed as limiting the system design.

Figure 16:
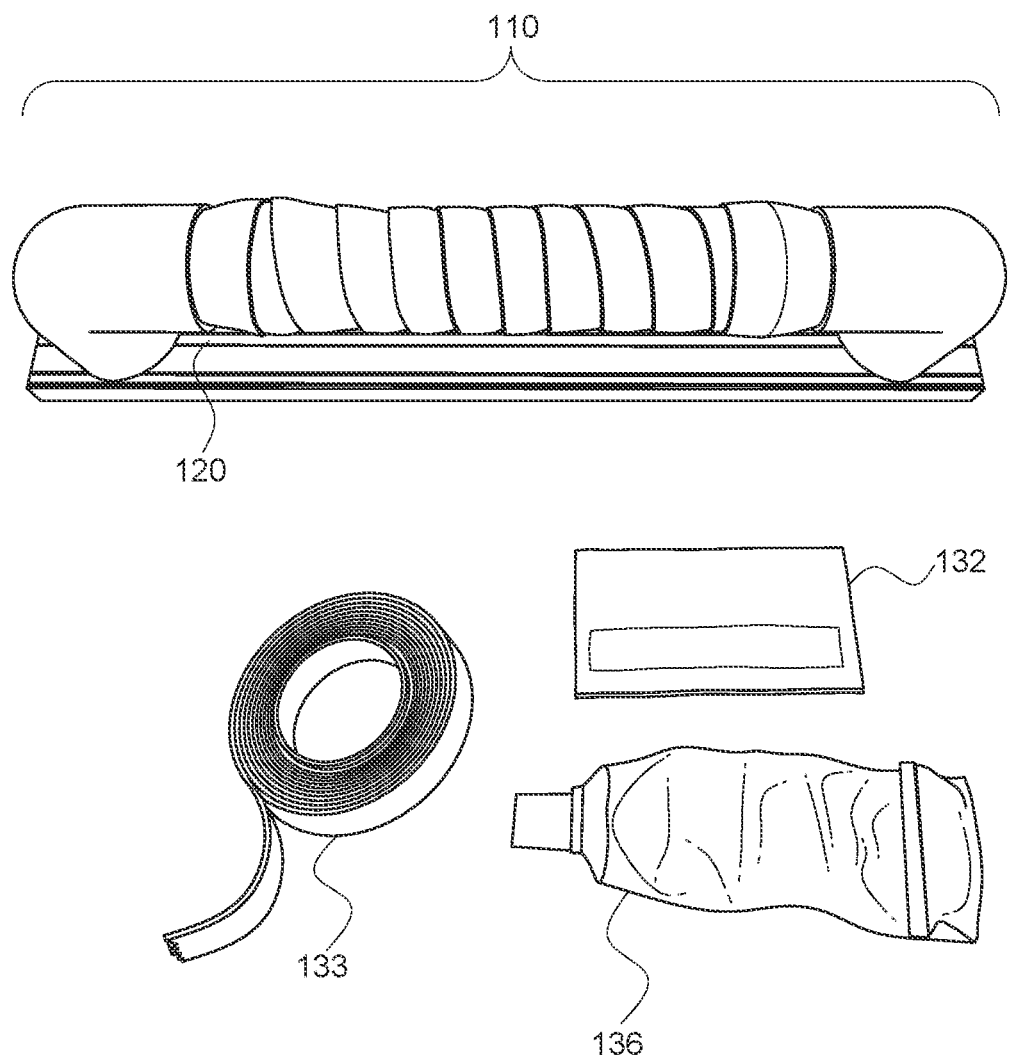
FIG. 16 is a view of a kit comprising an exemplary handle coupled to a support substrate and adhesives consistent with implementations of the current disclosure.

FIG. 16 is a view of a kit comprising an exemplary handle 110 coupled to a support substrate 120, a surface preparation wipe 132, a first adhesive 133, and a second adhesive 136 consistent with implementations of the current disclosure. The first adhesive 133 can be preapplied to the ends of the support substrate 120. The surface preparation wipe 132 can be optionally included within the kit.

Figure 17:
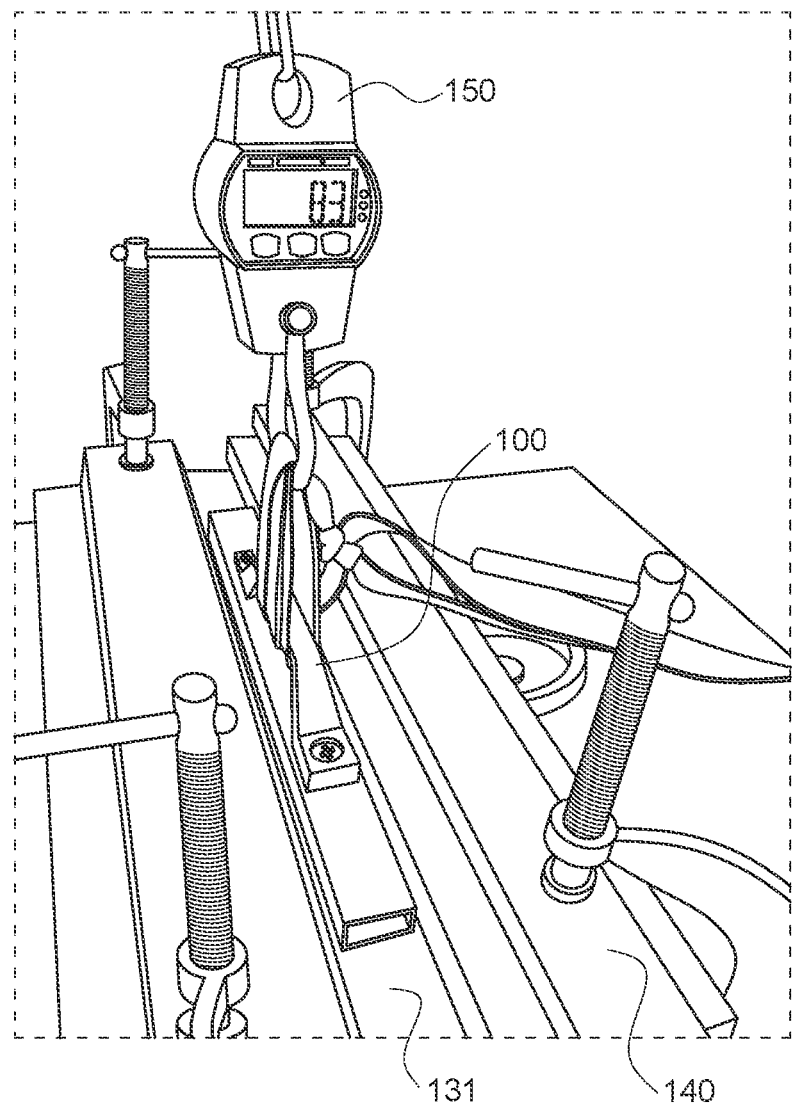
FIG. 17 is a view of testing apparatus for measuring the performance of the safety device systems consistent with implementations of the current disclosure.

FIG. 17 is a view of testing apparatus for measuring the performance of the systems. A force gauge 150 is attached to a system 100 for providing a handhold which is adhered to a test surface 131. Surface fixture 140 secures test surface 131 from moving as an upward force is applied to system 100 through force gauge 150, The force applied to separate the system from the test surface 131 can be gradually increased until failure. Depending on the conditions, failure occurs at various points within the system 100. Based on the testing data, the system 100 design has been improved and optimized to deliver a high level of performance.

Figure 18:
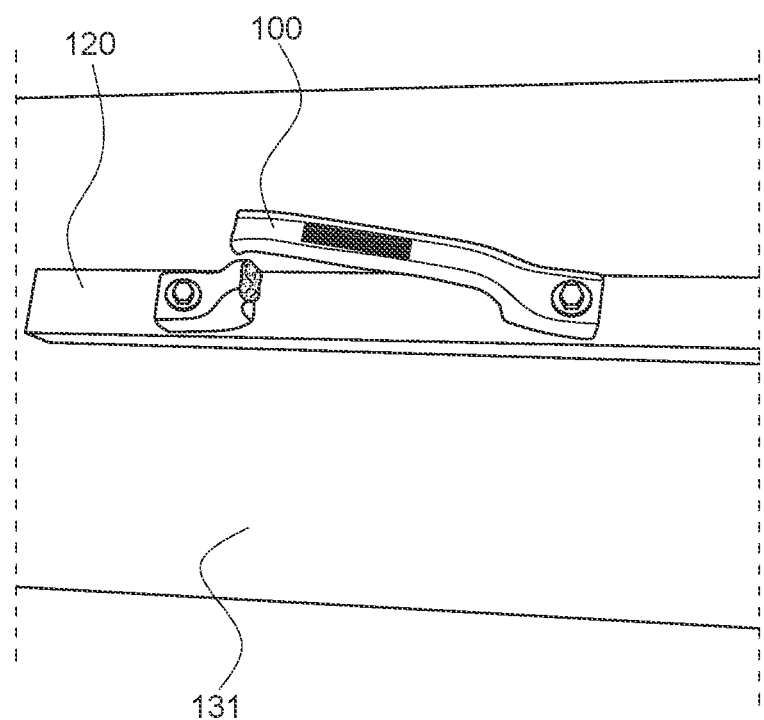
FIG. 18 is a view of comprising an exemplary handle coupled to a support substrate after being tested with a testing apparatus consistent with implementations of the current disclosure.

FIG. 18 is a view of comprising an exemplary handle 100 coupled to a support substrate 120 after being tested with a testing apparatus 150. The support substrate 120 remains adhered to the test surface 131 after testing, while the handle 110 has fractured into two pieces. The total load at failure was greater than 450 pounds of force. The system is designed to support an applied force of greater than 250 pounds of force.

EXAMPLES

Comparative Example 1

| | |
|---|---|
| typical suction grab bar | 250 pounds total strength |
| diameter of suction cup | 3.75 inches |
| times 2 cups, diameter | 7.5 inches |
| times 2 cups, total area | 23.6 square inches |
| strength per unit area (lbs/sq. in.) | 10.6 lbs/sq. in. |
| total grab bar load capacity* | 250 pounds |

*initial capacity with zero vacuum leakage

Example 1

| | |
|---|---|
| total bond area | 19.5 sq. in. |
| typical adhesive unit strength | 333.6 psi |
| total grab bar load capacity | 6493.5 pounds |
| reduced by a safety factor of 50% | 3247 pounds |
| Relative multiple strength of system over suction cup designs | 13x load capacity of suction cup design bars |

Example 2

| first adhesive | Dow 732 silicone |
| --- | --- |
| second adhesive | 3M Double Coated Urethane Foam Tape 4032 with 0.03 inches bondline |
| Tested to failure of handle at 455 lbs | |

The specific examples presented herein are intended to be illustrative and should not be construed as limiting in scope of the claims.

The foregoing detailed description has been given for clearness of understanding only and no unnecessary limitations should be understood there from as modifications will be obvious to those skilled in the art.

While described in connection with specific embodiments thereof, it will be understood that the principles described herein is capable of further modifications and this application is intended to cover any variations, uses, or adaptations following, in general, the principles disclosed herein and including such departures from the present disclosure as come within known or customary practice within the art to which the technology pertains and as may be applied to the essential features hereinbefore set forth and as follows in the scope of the appended claims.

The disclosures, including the claims, figures and/or drawings, of each and every patent, patent application, and publication cited herein are hereby incorporated herein by reference in their entireties.

What is claimed is:

1. A system providing a handhold to a shower surface or a bath surface, the system comprising:
    a handle configured to provide the handhold by allowing a user to grasp thereto;
    a support substrate coupled to the handle providing a rigid base, the support substrate having an outward surface facing the handle and an inward surface facing the shower surface or the bath surface;
    a first adhesive layer for coupling the support substrate to the shower surface or the bath surface, the first adhesive layer configured to support the weight of the system upon mounting the system to the shower surface or the bath surface;
    a second adhesive layer for coupling the support substrate to the shower surface or the bath surface, the second adhesive layer configured to support the weight of the system and a weight applied by the user after curing, wherein the second adhesive layer is formed by pressing the support substrate toward the shower surface or the bath surface until the first adhesive layer contacts both the inward surface and the shower surface or the bath surface.

2. The system of claim 1, wherein the handle has two ends and is coupled to the support substrate at each end of the handle.

3. The system of claim 1, wherein the handle and the support substrate are each portions of a monolithic structure.

4. The system of claim 1, wherein the support substrate is a rigid planar material.

5. The system of claim 1, wherein the inward surface includes a plurality of grooves, channels, and/or voids.

6. The system of claim 1, wherein the first adhesive layer is a self-adhesive foam tape.

7. The system of claim 1, wherein the second adhesive layer includes a second adhesive that cures at room temperature when exposed to moisture.

8. The system of claim 1, wherein a first adhesive layer thickness is selected to form a second adhesive layer thickness.

9. The system of claim 1, wherein a first adhesive layer thickness is substantially equal to a second adhesive layer thickness and the first adhesive layer and the second adhesive layer are substantially coplanar.

10. The system of claim 1, wherein a plurality of channels are configured to form a second adhesive layer thickness by allowing excess second adhesive to flow therethrough and form a mechanical connection between support substrate and cured second adhesive.

11. The system of claim 1, further comprising:
    a surface modification component disposed around at least a portion of the handle.

12. The system of claim 11, wherein the surface modification component that increases friction between the user and the handle under wet conditions.

13. The system of claim 1, wherein the system supports an applied force of greater than about 450 pounds of force before failure.

14. A system providing a handhold to a shower surface or a bath surface, the system comprising:
    a handle configured to provide the handhold by allowing a user to grasp thereto;
    a support substrate coupled to the handle providing a rigid base, the support substrate having an outward surface facing the handle and an inward surface facing the shower surface or the bath surface, wherein the inward surface includes a plurality of grooves, channels, and/or voids;
    a first adhesive layer for coupling the support substrate to the shower surface or the bath surface, the first adhesive layer configured to support the weight of the system upon mounting the system to the shower surface or the bath surface;
    a second adhesive layer for coupling the support substrate to the shower surface or the bath surface, the second adhesive layer configured to support the weight of the system and a weight applied by the user after curing, wherein the plurality of grooves, channels, and/or voids comprise between 10% to 50% of a surface area of the inner surface, wherein the second adhesive layer is formed by pressing the support substrate toward the shower surface or the bath surface until the first adhesive layer contacts both the inward surface and the shower surface or the bath surface.

15. The system of claim 14, wherein the plurality of grooves, channels, and/or voids comprise between 15% to 45% of the surface area of the inner surface.

16. The system of claim 15, wherein the plurality of grooves, channels, and/or voids comprise between 20% to 40% of the surface area of the inner surface.

17. The system of claim 16, wherein the plurality of grooves, channels, and/or voids comprise between 25% to 35% of the surface area of the inner surface.

18. The system of claim 14, wherein the inward surface includes a texture configured to increase adhesion with the first adhesive layer and/or the second adhesive layer.

19. A system providing a handhold to a shower surface or a bath surface, the system comprising:
    a handle configured to provide the handhold by allowing a user to grasp thereto;

a support substrate coupled to the handle providing a rigid base, the support substrate having an outward surface facing the handle and an inward surface facing the shower surface or the bath surface;

a first adhesive layer comprising a self-adhesive, closed-cell foam tape for coupling the support substrate to the shower surface or the bath surface, the first adhesive layer configured to support the weight of the system upon mounting the system to the shower surface or the bath surface;

a second adhesive layer comprising a moisture-cure silicone adhesive for coupling the support substrate to the shower surface or the bath surface, the second adhesive layer configured to support the weight of the system and a weight applied by the user after curing and formed by dispensing the moisture-cure silicone adhesive on the inward surface and then pressing the support substrate toward the shower surface or the bath surface until the first adhesive layer contacts both the inward surface and the shower surface or the bath surface, wherein a first adhesive layer thickness is substantially equal to a second adhesive layer thickness and the first adhesive layer and the second adhesive layer are substantially coplanar.

\* \* \* \* \*